United States Patent
Saito

(10) Patent No.: US 12,211,010 B2
(45) Date of Patent: Jan. 28, 2025

(54) INFORMATION PROCESSING DEVICE AND INFORMATION PROCESSING METHOD FOR VEHICLE INSPECTION OR REPAIR

(71) Applicant: TOYOTA JIDOSHA KABUSHIKI KAISHA, Aichi-ken (JP)

(72) Inventor: Tadashi Saito, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 432 days.

(21) Appl. No.: 17/667,548

(22) Filed: Feb. 9, 2022

(65) Prior Publication Data

US 2022/0318766 A1    Oct. 6, 2022

(30) Foreign Application Priority Data

Mar. 30, 2021   (JP) ................. 2021-058502

(51) Int. Cl.
| | |
|---|---|
| *G06Q 10/20* | (2023.01) |
| *G06Q 10/02* | (2012.01) |
| *G06Q 10/047* | (2023.01) |
| *G06Q 50/40* | (2024.01) |

(52) U.S. Cl.
CPC ............ *G06Q 10/20* (2013.01); *G06Q 10/02* (2013.01); *G06Q 10/047* (2013.01); *G06Q 50/40* (2024.01)

(58) Field of Classification Search
CPC ....... G06Q 10/02; G06Q 10/20; G06Q 10/047
See application file for complete search history.

(56) References Cited

U.S. PATENT DOCUMENTS

| | | | |
|---|---|---|---|
| 2015/0161554 A1* | 6/2015 | Sweeney ................ | G06Q 50/40 705/7.15 |
| 2017/0091890 A1* | 3/2017 | Hirose ................... | G06Q 50/10 |
| 2021/0304098 A1* | 9/2021 | Yang .................... | G01C 21/343 |
| 2022/0228875 A1* | 7/2022 | Cao ..................... | G01C 21/3453 |

FOREIGN PATENT DOCUMENTS

| | | | |
|---|---|---|---|
| JP | 2003-212100 A | | 7/2003 |
| JP | 2003187011 A | | 7/2003 |
| JP | 2020166760 A | * 10/2020 | ......... G06Q 10/0637 |

OTHER PUBLICATIONS

S. Nallusamy, A Proposed Model for Lead Time Reduction during Maintenance of Public Passenger Transport Vehicles, Apr. 2016, International Journal of Engineering Research in Africa (vol. 23), pp. 174-180 (Year: 2016).*

* cited by examiner

*Primary Examiner* — Rupangini Singh
(74) *Attorney, Agent, or Firm* — HAUPTMAN HAM, LLP

(57) ABSTRACT

An information processing device includes a control unit that executes: selecting a single or plurality of shops where inspection or repair of a vehicle is capable of being performed; acquiring a single or plurality of destinations; and calculating a total time length of a first time length, a second time length and a third time length, about all combinations of a first shop and a first destination, the first shop being one of the single or plurality of shops, the first destination being one of the single or plurality of destinations, the first time length being a time length for movement of the vehicle from a departure point to the first shop, the second time length being a time length for the inspection or repair at the first shop, the third time length being a time length for movement from the first shop to the first destination.

20 Claims, 13 Drawing Sheets

FIG. 4

VEHICLE INFORMATION DATABASE

| VEHICLE ID | VEHICLE TYPE | MODEL CODE | DISPATCH SERVICE | POSITION INFORMATION | TRAVELING DISTANCE |
|---|---|---|---|---|---|
| ⋮ | ⋮ | ⋮ | ⋮ | ⋮ | ⋮ |

FIG. 5

SHOP INFORMATION DATABASE

| SHOP ID | POSITION | EQUIPMENT | MENU ID | SCHEDULE INFORMATION | MAINTENANCE HISTORY INFORMATION |
|---------|----------|-----------|---------|----------------------|--------------------------------|
|         |          |           |         |                      |                                |
|         |          |           |         |                      |                                |
|         |          |           |         |                      |                                |

FIG. 6

MAINTENANCE MENU TABLE

| MENU ID | CONTENT | REQUIRED TIME |
|---|---|---|
|  |  |  |
|  |  |  |
|  |  |  |
|  |  |  |

FIG. 7

DISPATCH RESERVATION INFORMATION DATABASE

| RESERVATION ID | PLANNED GETTING-IN DATE AND HOUR | GETTING-IN PLACE | PLANNED ARRIVAL DATE AND HOUR | GETTING-OFF PLACE | DESIGNATION | VEHICLE ID |
|---|---|---|---|---|---|---|
| | | | | | | |
| | | | | | | |
| | | | | | | |

FIG. 8

MAINTENANCE SCHEDULE INFORMATION DATABASE

| SCHEDULE ID | VEHICLE ID | SHOP ID | DEPARTURE POINT | DESTINATION | Ta ROUTE INFORMATION | Tb MAINTENANCE INFORMATION | Tc ROUTE INFORMATION |
|---|---|---|---|---|---|---|---|
| | | | | | | | |
| | | | | | | | |
| | | | | | | | |

INFORMATION PROCESSING DEVICE AND INFORMATION PROCESSING METHOD FOR VEHICLE INSPECTION OR REPAIR

CROSS-REFERENCE TO RELATED APPLICATION

This application claims priority to Japanese Patent Application No. 2021-058502 filed on Mar. 30, 2021, incorporated herein by reference in its entirety.

BACKGROUND

1. Technical Field

The present disclosure relates to an information processing device and an information processing method.

2. Description of Related Art

There has been disclosed a technology of accepting vehicle information including a traveling distance of a vehicle at the time of inspection or repair, when the inspection or repair of the vehicle is performed, calculating a planned inspection or repair date from the vehicle information and a traveling distance, the number of hours and others until the inspection or repair is performed, and giving notice to a user for encouraging the user to perform garage entering (for example, Japanese Unexamined Patent Application Publication No. 2003-187011).

SUMMARY

An aspect of the disclosure has an object to provide an information processing device and an information processing method that make it possible to select a shop where the inspection or repair of the vehicle is performed, based on a time during which the vehicle cannot be used due to the inspection or the like.

An aspect of the present disclosure is
an information processing device including a control unit that executes:
  selecting a single or plurality of shops where inspection or repair of a vehicle is capable of being performed;
  acquiring a single or plurality of destinations; and
  calculating a total time length of a first time length, a second time length and a third time length, about all combinations of a first shop and a first destination, the first shop being one of the single or plurality of shops, the first destination being one of the single or plurality of destinations, the first time length being a time length that is spent on movement of the vehicle from a departure point to the first shop, the second time length being a time length that is spent on the inspection or repair at the first shop, the third time length being a time length that is spent on movement from the first shop to the first destination.

Another aspect of the present disclosure is
an information processing method including:
  selecting a single or plurality of shops where inspection or repair of a vehicle is capable of being performed;
  acquiring a single or plurality of destinations; and
  calculating a total time length of a first time length, a second time length and a third time length, about all combinations of a first shop and a first destination, the first shop being one of the single or plurality of shops, the first destination being one of the single or plurality of destinations, the first time length being a time length that is spent on movement of the vehicle from a departure point to the first shop, the second time length being a time length that is spent on the inspection or repair at the first shop, the third time length being a time length that is spent on movement from the first shop to the first destination.

With the present disclosure, it is possible to select the shop where the inspection or repair of the vehicle is performed, based on the time during which the vehicle cannot be used due to the inspection or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is an example of information that is held in a vehicle information database;

FIG. 5 is an example of information that is held in a shop information database;

FIG. 6 is an example of a maintenance menu table;

FIG. 7 is an example of information that is held in a dispatch reservation information database;

FIG. 8 is an example of information that is held in a maintenance schedule information database;

DETAILED DESCRIPTION OF EMBODIMENTS

Figure 1:
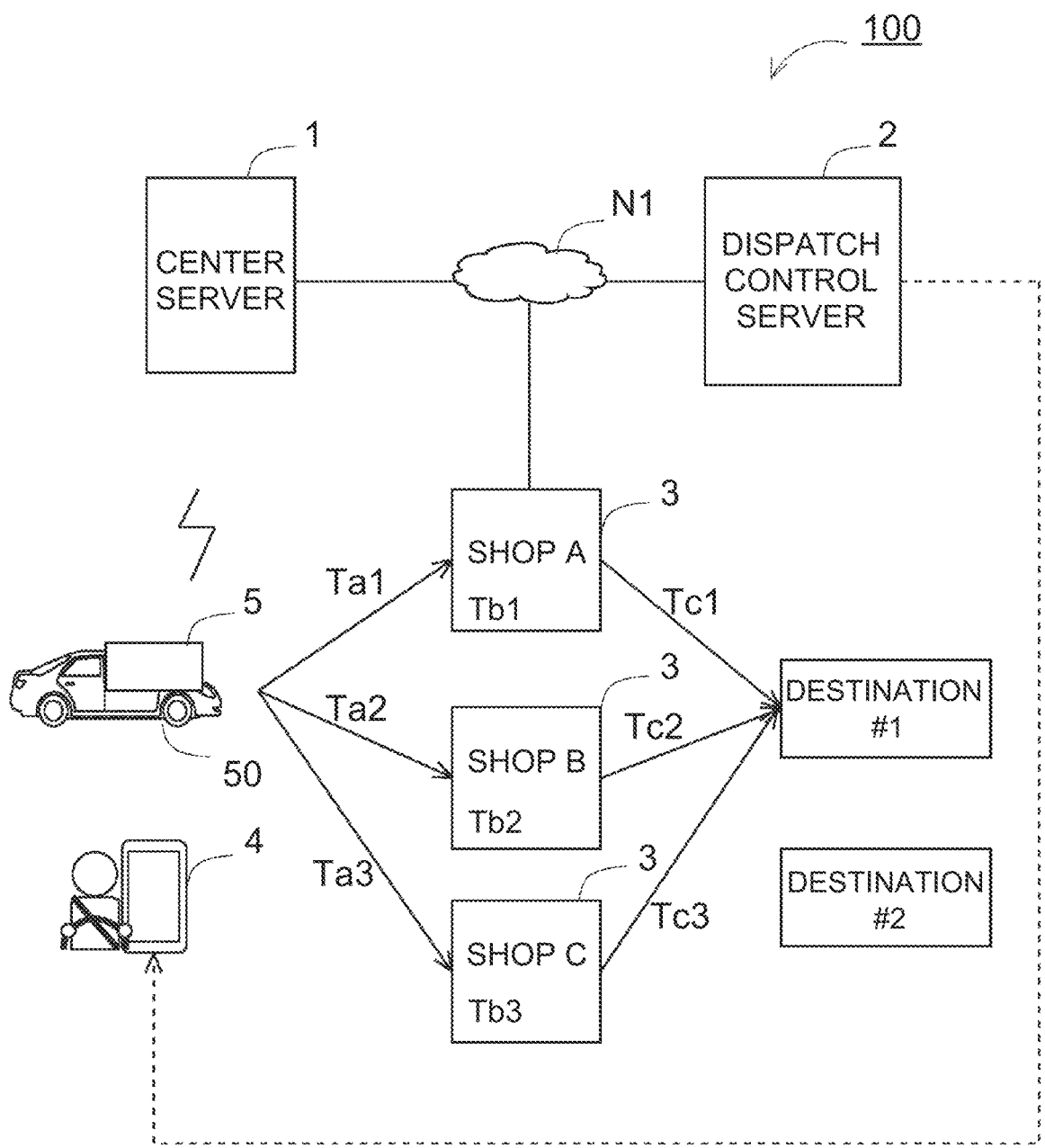
FIG. 1 is a diagram showing an example of the system configuration of a maintenance scheduling system according to a first embodiment.

As for a vehicle that is used for a dispatch service such as a taxi and ride-sharing, for example, when the operating time for the vehicle is decreased due to inspection, repair or the like, the business opportunity is lost by the decreased quantity. Meanwhile, the inspection and repair of the vehicle is necessary for safe traveling. A time during which the business opportunity is lost due to the inspection, repair or others of the vehicle is not limited to a time required for the inspection or repair, and includes a movement time before the inspection and repair. That is, the time during which the business opportunity is lost due to the inspection, repair or others of the vehicle is a time after the last passenger gets off the vehicle and before the next passenger gets in the vehicle after the inspection or repair. Hereinafter, the time during which the business opportunity is lost is referred to as a total downtime.

There is a demand to know the length of the total downtime that is spent on the inspection or repair. However, even when it is possible to predict a time that is spent on the inspection or maintenance at a shop, it is difficult to know the total downtime that includes a movement time to the shop or a movement time from the shop.

An aspect of the present disclosure is an information processing device. The information processing device includes a control unit that executes: selecting a single or plurality of shops where inspection or repair of a vehicle is capable of being performed; acquiring a single or plurality of destinations; and calculating a total time length of a first time length, a second time length and a third time length, about all combinations of a first shop and a first destination, the first shop being one of the single or plurality of shops, the first destination being one of the single or plurality of destinations, the first time length being a time length that is spent on movement of the vehicle from a departure point to the first shop, the second time length being a time length that is spent on the inspection or repair at the first shop, the third time length being a time length that is spent on movement from the first shop to the first destination.

For example, the information processing device is a server that monitors the traveling state of the vehicle. For example, in the case where the vehicle is a vehicle that is used for a dispatch service, the destination is a place where a passenger having a dispatch reservation gets in the vehicle, an event place where people gather, a station where a bad weather, an accident or the like has occurred, or the like. For example, in the case where the vehicle is a vehicle other than the vehicle that is used for a dispatch service, the destination may be a place that is set in a driver's schedule.

With the present disclosure, for each combination of the shop where the inspection or repair of the vehicle is performed and the destination, the total time length of the time (the first time length) for the movement to the shop, the time (the second time length) that is spent on the inspection or repair at the shop and the time (the third time length) for the movement from the shop to the destination is calculated. The total downtime is an example of the total time length. That is, with the aspect of the present disclosure, it is possible to select the shop where the inspection or repair of the vehicle is performed, from candidates of the shop where the inspection or repair of the vehicle is performed, based on the total downtime. Further, in the aspect of the present disclosure, the time (the third time length) for the movement from the shop where the inspection or repair of the vehicle is performed to the destination is included in the total downtime, and therefore it is possible to present a more accurate total downtime.

In the aspect of the present disclosure, the control unit may further execute receiving traveling state information relevant to traveling of the vehicle, and deciding a planned date and hour for the inspection or repair of the vehicle based on the traveling state information. In this case, the control unit may select the single or plurality of shops where the inspection or repair of the vehicle is capable of being performed on the planned date and hour, and may acquire the single or plurality of destinations where there is a demand for the vehicle around the planned date and hour. Thereby, it is possible to recognize the planned date and hour for the inspection or repair of the vehicle and the total downtime.

In the aspect of the present disclosure, the traveling state information may include at least position information about the vehicle, and the control unit may further execute acquiring a predicted traveling position of the vehicle at an hour that is a predetermined time before the planned date and hour, based on traveling history information including a history of the position information about the vehicle, when a first condition is satisfied based on the traveling state information, and setting the predicted traveling position of the vehicle as the departure point. For example, the first condition is a condition for performing the periodic inspection of the vehicle. For example, the condition for performing the periodic inspection of the vehicle is defined based on the traveling distance and the like. It is possible to predict the timing of the periodic inspection of the vehicle in advance, and it is possible to schedule the periodic inspection in good time. However, a position where the vehicle will travel before the periodic inspection is unknown. Hence, the departure point of the vehicle is predicted from the traveling history information about the vehicle, and thereby it is possible to more exactly calculate the total downtime.

In the aspect of the present disclosure, the traveling state information may include at least position information about the vehicle, and the control unit further may execute setting the current position of the vehicle as the departure point, when a second condition is satisfied based on the traveling state information. For example, the second condition is a condition for detecting an abnormality of the vehicle. For example, the condition for detecting an abnormality of the vehicle is defined based on the state of a component of the vehicle and the like. That is, when the second condition is satisfied, the urgency of the inspection or repair of the vehicle is high. With the aspect of the present disclosure, when the urgency of the inspection or repair of the vehicle is high, the current position of the vehicle is set as the departure point, and the total downtime is calculated for each combination of the candidate of the shop for the inspection or repair and the destination. Thereby, it is possible to present shops where the inspection or repair of the vehicle can be immediately performed, and the total downtimes when the respective shops are selected.

In the aspect of the present disclosure, the control unit may further execute creating schedule information about a combination of the first shop and the first destination for which the total time length is shortest, the schedule information including information about the inspection or repair of the vehicle at the first shop and the movement to the first destination after the inspection or repair at the first shop. Thereby, it is possible to create the schedule information for the maintenance of the vehicle about the combination of the shop and the destination for which the total downtime that is spent on the inspection or repair of the vehicle is shortest.

In the aspect of the present disclosure, the control unit may select the combination of the first shop and the first destination about which the control unit creates the schedule information, based on the total time length and road information relevant to a road included in a route from the departure point to the shop and a route from the shop to the destination. For example, the road information includes information relevant to construction, information relevant to congestion, and the like. The construction and the congestion influences increase in movement time, and therefore, by considering the information relevant to the construction and the information relevant to the congestion, it is possible to more accurately select the combination of the shop and the destination for which the total downtime is shortest.

In the aspect of the present disclosure, the control unit may select the combination of the first shop and the first destination about which the control unit creates the schedule information, based on the total time length and a possibility that a passenger gets in and gets off the vehicle on a route from the departure point to the shop. When the dispatch service can be executed until the movement from the departure point to the shop, it is possible to reduce the loss of the business opportunity, and to shorten the total downtime. Accordingly, with the aspect of the present disclosure, it is possible to select the combination of the shop where the inspection or repair of the vehicle is performed and the destination such that the total downtime becomes shorter.

In the aspect of the present disclosure, when the vehicle performs an action different from the schedule information, the control unit may select again a combination of the first shop and the first destination for which the total time length is shortest, and recreates the schedule information. Thereby, even when the vehicle performs a traveling different from the schedule information, it is possible to flexibly recreate the schedule information about the maintenance, based on the combination of the shop and the destination that causes the total downtime to be shorter.

In the aspect of the present disclosure, the control unit may further execute reserving the inspection or repair of the vehicle at the first shop included in the combination of the first shop and the first destination about which the control unit creates the schedule information. Thereby, it is possible to reduce the load on an administrator of the vehicle.

In the aspect of the present disclosure, the control unit may acquire a combination of the first shop and the first destination for which an hour when the vehicle is planned to arrive at the first destination from the first shop is an hour between an hour that is a first threshold time length before an hour when a demand for dispatch is generated at the first destination and the hour when the demand for the dispatch is generated, and may calculate the total time length about the acquired combination of the first shop and the first destination. In the case where the vehicle arrives at the destination too early, there is a possibility that the waiting time of the vehicle becomes long and the total downtime becomes long. With the aspect of the present disclosure, it is possible to exclude such a combination of the destination and the shop in advance.

In the aspect of the present disclosure, the control unit may acquire a combination of the first shop and the first destination for which a total time length of the first time length and the third time length is shorter than a time length resulting from adding a second threshold time length to a movement time when the vehicle directly moves from the departure point to the first destination, and may calculate the total time length about the acquired combination of the first shop and the first destination. Thereby, it is possible to exclude a combination of the destination and a shop at such a position that a roundabout trip is made when the vehicle goes from the departure point toward the destination, in advance.

Another aspect of the present disclosure can be specified as an information processing method in which the above information processing device executes the above process. That is, the information processing method includes: selecting a single or plurality of shops where inspection or repair of a vehicle is capable of being performed; acquiring a single or plurality of destinations; and calculating a total time length of a first time length, a second time length and a third time length, about all combinations of a first shop and a first destination, the first shop being one of the single or plurality of shops, the first destination being one of the single or plurality of destinations, the first time length being a time length that is spent on movement of the vehicle from a departure point to the first shop, the second time length being a time length that is spent on the inspection or repair at the first shop, the third time length being a time length that is spent on movement from the first shop to the first destination.

Further, another aspect of the present disclosure can be specified as a program that causes a computer to execute the process in the above information processing method or a non-transitory computer-readable recording medium in which the program is stored.

Embodiments of the present disclosure will be described below based on the drawings. The configurations of the embodiments described below are examples, and the present disclosure is not limited to the configurations of the embodiments.

First Embodiment

FIG. 1 is a diagram showing an example of the system configuration of a maintenance scheduling system 100 according to a first embodiment. The maintenance scheduling system 100 is a system that schedules the inspection or repair of the vehicle. In the first embodiment, the maintenance scheduling system 100 provides a service with the vehicle that is used for a dispatch service.

The maintenance scheduling system 100 includes a center server 1, a dispatch control server 2, a shop server 3 and an in-vehicle device 5. A plurality of shop servers 3 and a plurality of in-vehicle devices 5 are included, but in FIG. 1, a single shop server 3 and a single in-vehicle device 5 are extracted and shown. A plurality of dispatch control servers 2 may be included, but in the first embodiment, only a single dispatch control server 2 is included. The center server 1, the dispatch control server 2, the shop server 3 and the in-vehicle device 5 are connected with a network N1, and can communicate with each other through the network N1.

For example, the center server 1 is a server of the manufacturer of the vehicle 50, and monitors the traveling state of the vehicle 50 by periodically receiving information indicating the traveling state of the vehicle 50 from the in-vehicle device 5 mounted on the vehicle 50. Hereinafter, the information indicating the traveling state of the vehicle is referred to as traveling state information. For example, the traveling state information includes information about the vehicle 50, as exemplified by identification information, position information, traveling distance and information indicating the state of each component. For example, the information indicating the state of the component includes information indicating the degree of the abrasion of the component and information indicating whether the component is broken down.

The shop server 3 is a server in a shop of a dealer for the manufacturer of the vehicle 50, an automobile inspection-repair operator that is tied up with the manufacturer, or the like. Hereinafter, a shop means a shop where the inspection or repair of the vehicle is performed.

The center server 1 communicates with the shop server 3 installed in each shop, and holds information about equipment and schedule information about the inspection or repair for each shop. The dispatch control server 2 is a server of a business operator that provides the dispatch service. The dispatch control server 2 communicates with a user terminal 4 of a user that is registered as a driver for the dispatch service, and sends an instruction of movement to a designated getting-in place for a passenger, to the user terminal 4, when a request for dispatch is generated.

The entrance of the vehicle to the shop for the inspection or repair is referred to as garage entering. For example, the garage entering includes a periodic garage entering that is performed at a predetermined timing and an urgent garage entering that is performed in response to the occurrence of an abnormality. In the first embodiment, the center server 1 determines whether the periodic garage entering or urgent garage entering of the vehicle 50 is performed, based on the traveling state information from the in-vehicle device 5. Hereinafter, the inspection and the repair are collectively referred to as maintenance.

When the center server 1 determines that the periodic garage entering or urgent garage entering of the vehicle 50 is performed, the center server 1 acquires a planned maintenance date and hour based on the traveling state information. Further, the center server 1 decides the departure point of the vehicle 50 that goes for maintenance. In the case of the periodic garage entering, the center server 1 sets, as the departure point, a position where the vehicle 50 is estimated to travel at an hour that is a predetermined time before the planned maintenance date and hour. For example, the hour when the estimated traveling position is acquired is an arbitrary hour between one hour before the planned maintenance date and hour and the planned maintenance date and hour. In the case of the urgent garage entering, the center server 1 sets the current position of the vehicle 50, as the departure point.

The center server 1 extracts a shop where the maintenance of the vehicle 50 can be performed, from shops that exist in a predetermined range from the departure point. For example, the extraction range of the shop is a range of a predetermined distance from the departure point or an area that is defined in advance and that contains the departure point. The shop where the maintenance can be performed is a shop that includes maintenance equipment and a mechanic corresponding to the equipment and performance of the vehicle 50 and that is available on the planned maintenance date and hour.

Next, the center server 1 acquires, as a destination, a point that exists in a predetermined range from the departure point of the vehicle 50 and where there is a demand for dispatch after the planned maintenance date and hour for the vehicle 50. For example, the extraction range of the destination may be the same as the extraction range of the shop, or may be set to a wider range than the extraction range of the shop. Examples of the request for dispatch include a reservation for the dispatch service, an event that is performed while people are gathered, a bad weather and a construction. Examples of the point where there is a demand for dispatch include a place where a passenger having a reservation for the dispatch service gets in the vehicle 50, a place where an event is curried out, and a station of a public transit agency.

For each combination of an extracted shop x and an extracted destination y, the center server 1 calculates the total time length of a movement time Ta from the departure point to the shop x, a working time Tb at the shop x and a movement time Tc from the shop x to a destination y. In the first embodiment, the total downtime is defined as the total time length of Ta, Tb and Tc. In the first embodiment, about a combination of the shop x and the destination y for which the total downtime is shortest, the center server 1 reserves the maintenance of the vehicle 50 at the shop x, creates the schedule of the maintenance of the vehicle 50, and gives the notice of the schedule to the user terminal 4 of the driver of the vehicle 50, through the dispatch control server 2.

With the first embodiment, the center server 1 can create the schedule including the shop and destination for which the total downtime is shortest, about the maintenance of the vehicle 50. Thereby, it is possible to reduce the loss of the business opportunity due to the maintenance of the vehicle 50 that is used for the dispatch service.

Figure 2:
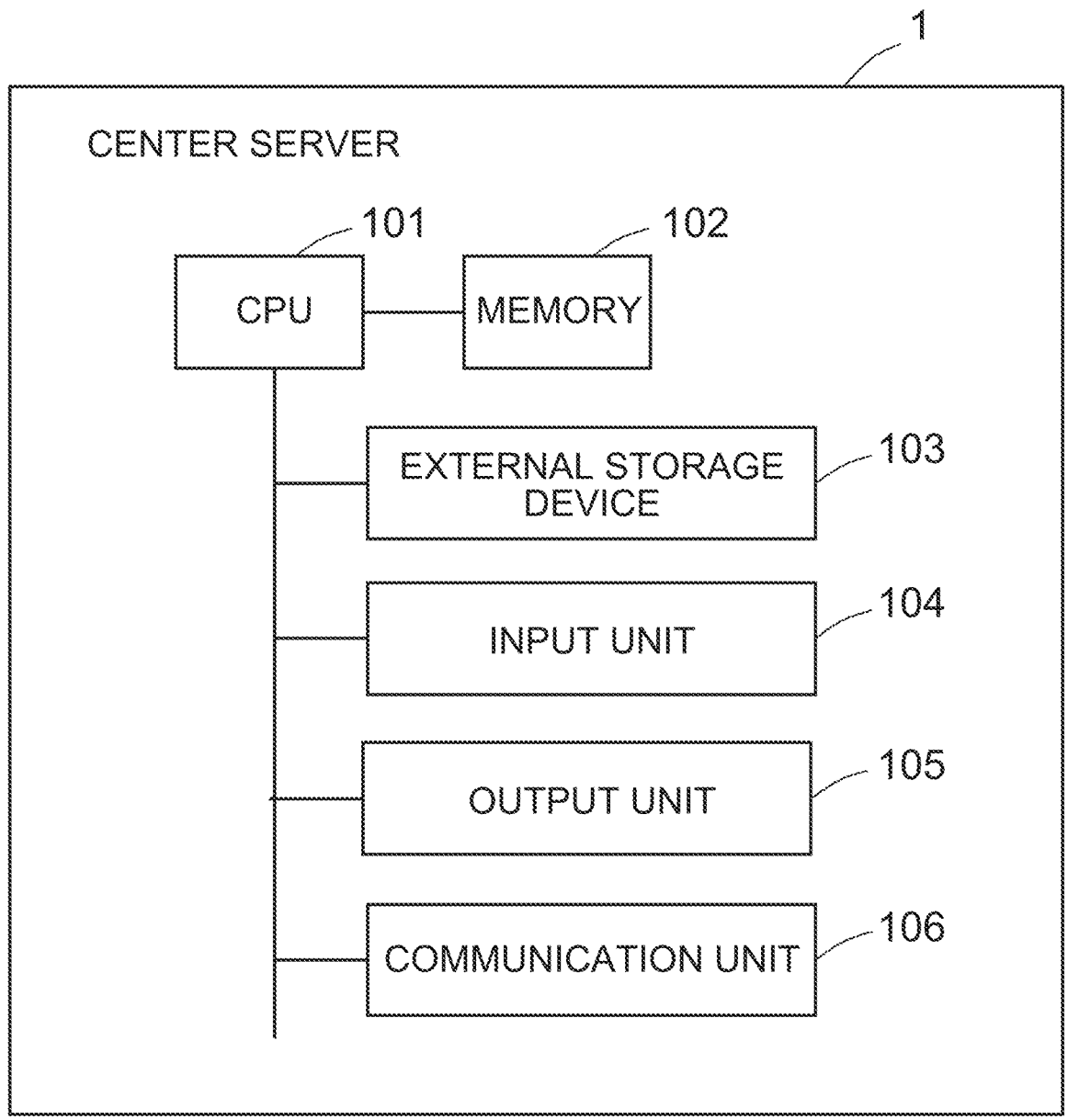
FIG. 2 is a diagram showing an example of the hardware configuration of a center server.

FIG. 2 is a diagram showing an example of the hardware configuration of the center server 1. For example, the center server 1 is a dedicated computer such as a server or a general-purpose computer such as a personal computer (PC). The center server 1 includes a central processing unit (CPU) 101, a memory 102, an external storage device 103, an input unit 104, an output unit 105 and a communication unit 106, as the hardware configuration. The memory 102 and the external storage device 103 are computer-readable recording media.

The external storage device 103 contains various programs and data that is used by the CPU 101 for the execution of the programs. For example, the external storage device 103 is an erasable programmable ROM (EPROM) or a hard disk drive. For example, the program held in the external storage device 103 includes an operating system (OS), a control program for the maintenance scheduling system 100, and other various application programs.

The memory 102 is a storage device that provides a storage region and a working region for loading the program contained in the external storage device 103, to the CPU 101, or that is used as a buffer. For example, the memory 102 includes a semiconductor memory such as a read only memory (ROM) and a random access memory (RAM).

The CPU 101 executes various processes by loading the OS and various application programs held in the external storage device 103 on the memory 102 and executing the OS and various application programs. The number of CPUs 101 is not limited to one, and a plurality of CPUs 101 may be included. The CPU 101 is an example of the "control unit".

For example, the input unit 104 is an input device including a keyboard and a pointing device such as a mouse. A signal input from the input unit 104 is output to the CPU 101. The output unit 105 is an output device such as a display and a printer. The output unit 105 outputs information in response to the input of a signal from the CPU 101. The input unit 104 and the output unit 105 may be a voice input device and a voice output device, respectively.

The communication unit 106 is an interface that performs the input and output of information with a network. The communication unit 106 may be an interface that is connected with a wired network, or may be an interface that is connected with a wireless network. For example, the communication unit 106 is a network interface card (NIC), a wireless circuit or the like. The hardware configuration of the center server 1 is not limited to the hardware configuration shown in FIG. 2. Similarly to the center server 1, the dispatch control server 2 has a hardware configuration including a CPU, a memory, an external storage device, an input unit, an output unit and a communication unit.

Figure 3:
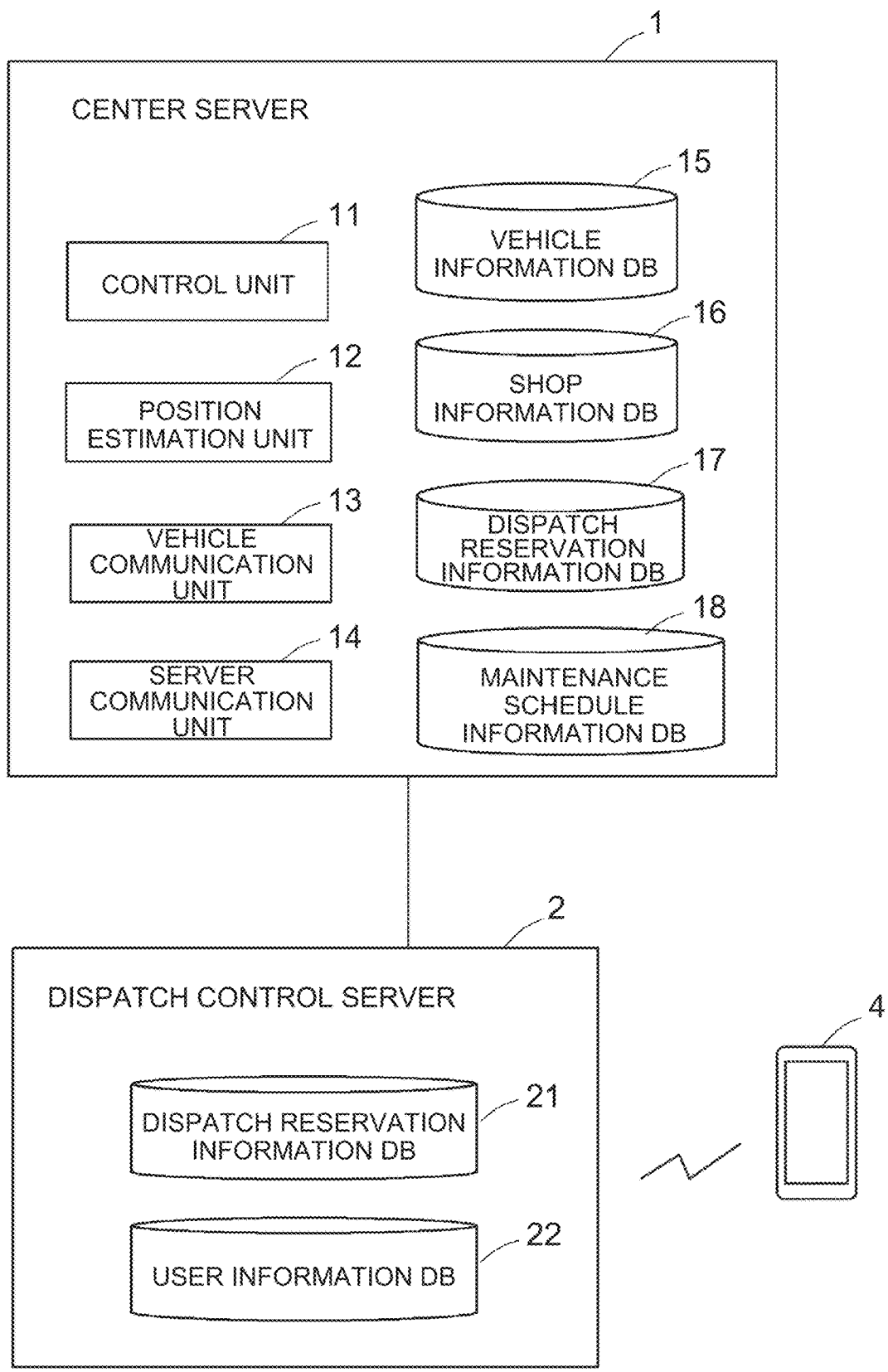
FIG. 3 is a diagram showing examples of the functional configurations of the center server and a dispatch control server.

FIG. 3 is a diagram showing examples of the functional configurations of the center server 1 and the dispatch control server 2. The center server 1 includes a control unit 11, a position estimation unit 12, a vehicle communication unit 13, a server communication unit 14, a vehicle information database (DB) 15, a shop information DB 16, a dispatch reservation information DB 17 and a maintenance schedule information DB 18, as functional configuration elements. For example, the functional configuration elements are achieved when the CPU 101 of the center server 1 executes the control program for the maintenance scheduling system 100.

The vehicle communication unit 13 is an interface for the communication with the in-vehicle device 5. For example, the vehicle communication unit 13 receives the traveling state information about the vehicle 50 from the in-vehicle device 5, with a predetermined period. For example, the traveling state information includes information about the vehicle 50, as exemplified by identification information, position information, traveling distance and information indicating the state of each component. The vehicle communication unit 13 outputs the received traveling state information to the control unit 11.

The server communication unit 14 is an interface for the communication with the dispatch control server 2 and the shop server 3. For example, the server communication unit 14 receives dispatch reservation information from the dispatch control server 2, and outputs the dispatch reservation information to the control unit 11. For example, the dispatch reservation information includes information indicating a planned getting-in date and hour and getting-in place about the dispatch reservation. For example, the server communication unit 14 receives the schedule information from the shop server 3, and outputs the schedule information to the control unit 11. For example, the schedule information from the shop server 3 includes information indicating a menu of the maintenance, a planned start date and hour and planned end date and hour about the maintenance, use equipment and the like. For example, in accordance with an instruction from the control unit 11, the server communication unit 14 sends the schedule information about the maintenance of the vehicle 50, to the dispatch control server 2.

The position estimation unit 12 acquires an estimated value of the traveling position of the vehicle 50 on a date and hour designated by the control unit 11, in accordance with an instruction from the control unit 11. For example, the estimated value of the traveling position of the vehicle 50 may be acquired based on the traveling history information about the vehicle 50, or may be acquired using a model after learning or the like. For example, in the traveling history information about the vehicle 50, the position information included in the traveling state information received from the vehicle 50 is accumulated. The estimated traveling position about the vehicle 50 is output to the control unit 11.

The control unit 11 creates the schedule of the maintenance of the vehicle 50. Specifically, the control unit 11 determines whether the periodic garage entering or urgent garage entering is performed, based on the traveling state information about the vehicle 50. It is determined that the periodic garage entering and the urgent garage entering are performed, when a periodic garage entering condition and an urgent garage entering condition are satisfied, respectively. For example, the periodic garage entering condition is defined by the traveling distance. For example, the periodic garage entering condition is a condition that the traveling distance reaches a predetermined distance such as 10000 kilometers and 20000 kilometers, or a condition that the traveling distance reaches a distance of the predetermined distance—α. For example, the urgent garage entering condition is a condition that the information included in the traveling state information and indicating the state of the component indicates the breakdown of a component or the abrasion of a component. The periodic garage entering condition and the urgent garage entering condition are not limited to them. The periodic garage entering condition is an example of the "first condition". The urgent garage entering condition is an example of the "second condition".

In the case where the periodic garage entering condition or urgent garage entering condition is satisfied about the vehicle 50, the control unit 11 first decides the planned maintenance date and hour. In the case of the periodic garage entering, for example, it is decided that the planned maintenance date and hour is a predetermined hour on a date after a predetermined number of days, as exemplified by a date after one week and a date after two weeks. Alternatively, for example, the planned maintenance date and hour in the case of the periodic garage entering may be set to a day of the week or an hour of the day when the vehicle 50 is less operated, based on the traveling history information about the vehicle 50 and the like. In the case of the urgent garage entering, the state of the vehicle 50 is determined based on the traveling state information, and the planned maintenance date and hour may be decided depending on the state of the vehicle 50. For example, in the case where the urgency is high, it may be decided that the planned maintenance date and hour is the current hour or an hour after a predetermined time from the current hour. For the urgent garage entering, for example, associating a menu of the maintenance and a time length before an hour to which the planned maintenance date and hour is set may be set in advance.

Next, the control unit 11 decides the departure point in the schedule of the maintenance. In the case of the periodic garage entering, for example, the departure point in the schedule of the maintenance is set to the estimated traveling position of the vehicle 50 at an hour that is a predetermined time before the planned maintenance data and hour. For example, the traveling position of the vehicle 50 is estimated about one hour before the planned maintenance date and hour. The estimated traveling position of the vehicle 50 is acquired from the position estimation unit 12. In the case of the urgent garage entering, the departure point in the schedule of the maintenance is set to the current position of the vehicle 50. The current position about the vehicle 50 is acquired as the position information included in the last traveling state information that is received from the in-vehicle device 5.

Next, the control unit 11 extracts a shop that the vehicle 50 can enter on the planned maintenance date and hour. The shop that the vehicle 50 can enter is a shop that is available on a date and hour around the planned maintenance date and hour, that includes equipment allowing the menu of the maintenance to be performed, and at which the vehicle 50 can arrive from the departure point on a date and hour around the planned maintenance date and hour. For example, the date and hour around the planned maintenance date and hour is a date and hour that is included in the planned maintenance date and hour±β. For example, β is an arbitrary time length of five minutes to one hour. The determination condition for the shop that the vehicle 50 can enter is not limited to the above condition, and for example, may include a condition that the shop that the vehicle 50 can enter is a shop that is in a range of a predetermined distance from the departure point of the vehicle 50, or a shop that is in the same area as the area of the departure point of the vehicle 50.

Next, the control unit 11 acquires the destination in the schedule of the maintenance of the vehicle 50. For example, the destination in the schedule of the maintenance of the vehicle 50 is a place that is in a range of a predetermined distance from the departure point of the vehicle 50 and where the demand for the dispatch service is predicted to be generated within a predetermined time after the planned maintenance date and hour. For example, the place where the demand for the dispatch service is predicted to be generated is a place where a passenger having a reservation for the dispatch service gets in the vehicle 50, an event place where people gather, a station of a railroad when a bad weather is predicted, or the like. The reservation information about the dispatch service is acquired from the dispatch control server 2 through the server communication unit 14. Information about the event, the weather and the like is acquired from the web.

For example, a priority order is given so as to satisfy "a getting-in place for a passenger that has a reservation for the dispatch service and that designates the driver of the vehicle 50">"a getting-in place for a passenger that has a reservation for the dispatch service and that does not designate the driver">"an event place where people gather">"a station of a railroad when a bad weather is predicted". In the case where there are a plurality of places as the candidate of the destination in the schedule, the control unit 11 selects a predetermined number of places from the highest priority in the above priority order as the destination in the schedule.

Next, the control unit 11 calculates the total downtime for each combination of the shop and the destination. For example, in the case where there are three shops that the vehicle 50 can enter and where there are three destinations, nine combinations are obtained, and the total downtime is acquired for each of the nine combinations.

The control unit 11 selects the combination of the shop and the destination for which the total downtime is shortest, from the calculated total downtimes, and creates the schedule information about the maintenance of the vehicle 50 such that the maintenance is performed at the selected shop and the vehicle 50 goes from the selected shop toward the selected destination. Hereinafter, the created schedule information is referred to as maintenance schedule information. The control unit 11 reserves the maintenance of the vehicle 50 at the selected shop. The control unit 11 sends the created maintenance schedule information to the dispatch control server 2 through the server communication unit 14, and the dispatch control server 2 gives notice to the user terminal 4 of the driver of the vehicle 50. The created maintenance schedule information is registered in the maintenance schedule information DB 18.

A combination of the shop and the destination for which the hour of the arrival at the destination is an hour that is a first threshold time length or more before the hour of the dispatch demand at the destination may be excluded from the target of the calculation of the total downtime. This is because there is a possibility that the waiting time of the vehicle 50 at the destination becomes the first threshold time length or more.

In the case where the total time of the movement time Ta from the departure point to the shop and the movement time Tc from the shop to the destination is longer, by a second threshold time length or more, than the movement time for the direct movement from the departure point to the destination, the combination of the shop and the destination may be excluded from the target of the calculation of the total downtime. This is because a time loss for the garage entering is restrained from being long. The first threshold time length and the second threshold time length may be identical, or may be different.

In the case of the same total downtime, a priority order may be given to combinations of the shop and the destination, depending on the road information about roads on movement routes, and the maintenance schedule information may be created for the combination having the highest priority. For example, the road information is congestion information or construction information. The congestion information and the construction information can be acquired from a predetermined organization. For example, for a route not including a road for which a future congestion is predicted, the priority of the combination of the shop and the destination is set to a higher priority, compared to a route including a road for which a future congestion is predicted.

Further, in the case of the same total downtime, the priority of the combination of the shop and the destination for which the possibility that the dispatch service is performed on a route from the departure point to the shop is higher may be set to a higher priority. The possibility that the dispatch service is performed can be acquired by acquiring the dispatch reservation information from the dispatch control server 2, for example.

The control unit 11 monitors whether the maintenance is being performed in accordance with the schedule in the created maintenance schedule information, and creates the maintenance schedule information again in the case where the maintenance is not being performed.

The vehicle information DB 15, the shop information DB 16, the dispatch reservation information DB 17 and the maintenance schedule information DB 18 are created in the external storage device 103 of the center server 1. The vehicle information DB 15 holds vehicle information relevant to the vehicle. The shop information DB 16 holds shop information relevant to the shop. The dispatch reservation information DB 17 holds the dispatch reservation information that is acquired from the dispatch control server 2. The maintenance schedule information DB 18 holds the maintenance schedule information created by the control unit 11. Details of the information held in the respective databases will be described later.

The dispatch control server 2 includes a dispatch reservation information DB 21 and a user information DB 22. The dispatch reservation information DB 21 and the user information DB 22 are created in a storage region of the external storage device of the dispatch control server 2. The dispatch reservation information DB 21 holds the dispatch reservation information. The user information DB 22 holds user information relevant to the user that is registered in the dispatch service. The user information includes identification information about the user, information indicating whether the user is registered as the driver, information relevant to the vehicle 50 that is used in the case where the user is registered as the driver, and the like. The information relevant to the vehicle 50 that is used includes identification information about the vehicle 50, the type of the vehicle 50, the color of a vehicle body, the number of persons that can ride in the vehicle 50, and the like. For example, the identification information about the vehicle 50 may be information described on a number plate, or terminal identification information about the in-vehicle device 5.

Each of the functional configurations of the center server 1 and the dispatch control server 2 may be achieved by the cooperation of a plurality of information processing devices, without being limited to the achievement by a single information processing device. Alternatively, a single information processing device may execute the processes of the center server 1 and the dispatch control server 2.

FIG. 4 is an example of the information that is held in the vehicle information DB 15. The vehicle information DB 15 holds the information relevant to the vehicle that is managed by the center server 1. For example, each record of the vehicle information DB 15 includes fields of vehicle ID, vehicle type, model code, dispatch service, position information, traveling distance and the like.

The vehicle ID field contains the identification information about the vehicle. The vehicle type field contains the information indicating the type of the vehicle. For example, the vehicle type may be the brand name, the series name or the like of the vehicle, or may be information indicating the kind of the vehicle, as exemplified by a sedan and a wagon. The model code field contains identification information indicating a model code written on a vehicle inspection certificate of the vehicle. The values of the vehicle ID field, the vehicle type field and the model code field are set in advance.

The dispatch service field contains information indicating whether the vehicle is a vehicle that is used for the dispatch service. For example, the information indicating whether the vehicle is a vehicle that is used for the dispatch service is shown by a flag or a code. For example, the information indicating whether the vehicle is used for the dispatch service can be acquired from the dispatch control server 2. In the first embodiment, the vehicle that is used for the dispatch service is the vehicle 50.

The position information field contains the position information about the vehicle. For example, the position information is shown by latitude and longitude. The traveling distance field contains the traveling distance about the vehicle. The values of the position information field and the traveling distance field are acquired from the traveling state information that is periodically received from the vehicle. When the traveling state information is received from the vehicle, the position information field and traveling distance field for the corresponding vehicle are updated to values included in the traveling state information, by the control unit 11.

The information contained in the vehicle information DB 15 is not limited to the information shown in FIG. 4. As the information relevant to the vehicle, information other than the identification information, vehicle type and model code about the vehicle may be contained in the vehicle information DB 15. Further, as the traveling state information about the vehicle, information other than the position information and the traveling distance may be contained in the vehicle information DB 15.

FIG. 5 is an example of the information that is held in the shop information DB 16. In the shop information DB 16, information relevant to the shop is held. For example, each record of the shop information DB 16 includes fields of shop ID, position, equipment, menu ID, schedule information and maintenance history information.

The shop ID field contains identification information about the shop. The position field contains position information about the shop. For example, the position information about the shop that is contained in the position field is shown by latitude and longitude or by an address. The equipment field contains information indicating maintenance equipment that is included in the shop. The menu ID field contains identification information about a menu of the maintenance that can be performed in the shop.

The schedule information field contains the schedule information about the maintenance that is reserved at the shop. The schedule information includes the identification information about the vehicle to which the maintenance is performed, the identification information about a menu of the maintenance that is planned to be performed, identification information about a mechanic that performs the maintenance, a date and hour when the maintenance is planned to be performed, and information indicating equipment that is planned to be used, for each schedule. For example, the date and hour when the maintenance is planned to be performed includes a planned start hour and a planned end hour.

The maintenance history information field contains history information about the maintenance performed in the shop. For example, the maintenance history information includes the identification information about the vehicle to which the maintenance was performed, the identification information about a menu of the maintenance that was performed, the identification information about a mechanic that performed the maintenance, a date and hour when the maintenance was performed, and information indicating equipment that was used, for each schedule.

For example, the equipment field, the schedule information field and the maintenance history information field may contain information indicating maintenance equipment, the schedule information and the address of a storage region in which the maintenance history information is contained, respectively.

For example, the control unit 11 periodically receives the schedule information and the maintenance history information from each shop server 3, at a predetermined timing, and updates the schedule information field and maintenance history information field of the shop information DB 16. For example, the timing when the schedule information and the maintenance history information is sent from each shop server 3 is a predetermined hour of every day, or a timing when the schedule of the maintenance is completed. The information contained in the shop information DB 16 is not limited to the information shown in FIG. 5.

FIG. 6 is an example of a maintenance menu table. The maintenance menu table is a table that holds information relevant to each menu of the maintenance. For example, the maintenance menu table is held in the shop information DB 16.

The maintenance menu table includes fields of menu ID, content and required time. The menu ID field contains the identification information about the menu of the maintenance. The content field contains information indicating a maintenance content about the menu. The required time field contains a roughly expected time required for the maintenance about the menu.

The maintenance menu table is prepared in advance. For example, the actual maintenance is performed by combining maintenance menus depending on the state of the vehicle. The maintenance menu table shown in FIG. 6 is an example, and the maintenance menu table is not limited to this.

FIG. 7 is an example of information that is held in the dispatch reservation information DB 17. In the dispatch reservation information DB 17, the dispatch reservation information is held. One record of the dispatch reservation information DB 17 corresponds to one dispatch service. Each record of the dispatch reservation information DB 17 includes fields of reservation ID, planned getting-in date and hour, getting-in place, planned arrival date and hour, getting-off place, designation and vehicle ID.

The reservation ID field contains identification information about the dispatch reservation. The planned getting-in date and hour field and the planed arrival date and hour field contain dates and hours when the passenger is planned to get in and get off the vehicle, respectively. The getting-in place field and the getting-off place field contain information indicating a getting-in place designated by the passenger and information indicating a getting-off place designated by the passenger, respectively. For example, the information indicating the getting-in place and the getting-off place are shown by latitude and longitude, by an address or by a building name. The getting-in place is one of the destinations in the maintenance schedule for the vehicle 50.

The designation field contains information indicating whether the passenger has designated the driver. For example, the information indicating whether the passenger has designated the driver is shown by a flag. The vehicle ID field contains the identification information about the vehicle that is used by the driver designated by the passenger. In the case where the value of the designation field indicates that the passenger has designated the driver, a value is contained in the vehicle ID field. In the case where the value of the designation field indicates that the passenger has not designated the driver, the vehicle ID field is empty.

For example, the dispatch reservation information is acquired from the dispatch control server 2 at a predetermined timing, and is updated by the control unit 11. For example, the dispatch reservation information is acquired with a predetermined period or when the maintenance schedule information about the vehicle is created. The information that is contained in the dispatch reservation information DB 17 is not limited to the information shown in FIG. 7.

FIG. 8 is an example of information that is held in the maintenance schedule information DB 18. In the maintenance schedule information DB 18, the maintenance schedule information about the vehicle 50 is held. One record of the maintenance schedule information DB 18 corresponds to the schedule that is created by the control unit 11 about one maintenance for the vehicle 50. Each record of the maintenance schedule information DB 18 includes fields of schedule ID, vehicle ID, shop ID, departure point, destination, Ta route information, Tb maintenance information and Tc route information.

The schedule ID field contains identification information about the schedule. The vehicle ID field contains the identification information about the vehicle 50 to which the maintenance is performed. The shop ID field contains the identification information about the shop at which the maintenance of the vehicle 50 is reserved. The departure point filed and the destination field contains information indicating the departure point in the schedule and information indicating the destination in the schedule, respectively. For example, the information indicating the departure point in the schedule and the information indicating the destination in the schedule are shown by latitude and longitude, by an address, or by a building name.

The Ta route information field contains route information from the departure point to the shop. The Tc route information filed contains route information from the shop to the destination. For example, the route information includes a departure spot, a planned departure date and hour, a destination, a planned arrival date and hour, a planned required time, a course and others about the route. The departure spot and destination in the Ta route information are the departure spot in the schedule and the shop where the maintenance is planned to be performed, respectively. The departure spot and destination in the Tc route information are the shop where the maintenance is planned to be performed and the destination in the schedule, respectively.

The Tb maintenance information field contains information relevant to the maintenance of the vehicle 50. For example, the information relevant to the maintenance of the vehicle 50 includes a planned garage entering date and hour, a planned garage leaving date and hour, and a menu content of the maintenance.

For example, the maintenance schedule information is created by the control unit 11, and is registered in the maintenance schedule information DB 18. When the schedule of the maintenance is performed and completed, the schedule of the maintenance is deleted from the maintenance schedule information DB 18 by the control unit 11. For example, the notice of the completion of the schedule of the maintenance is given from the shop server 3. The information contained in the maintenance schedule information DB 18 is not limited to the information shown in FIG. 8.

Processing Flow

Figure 9:
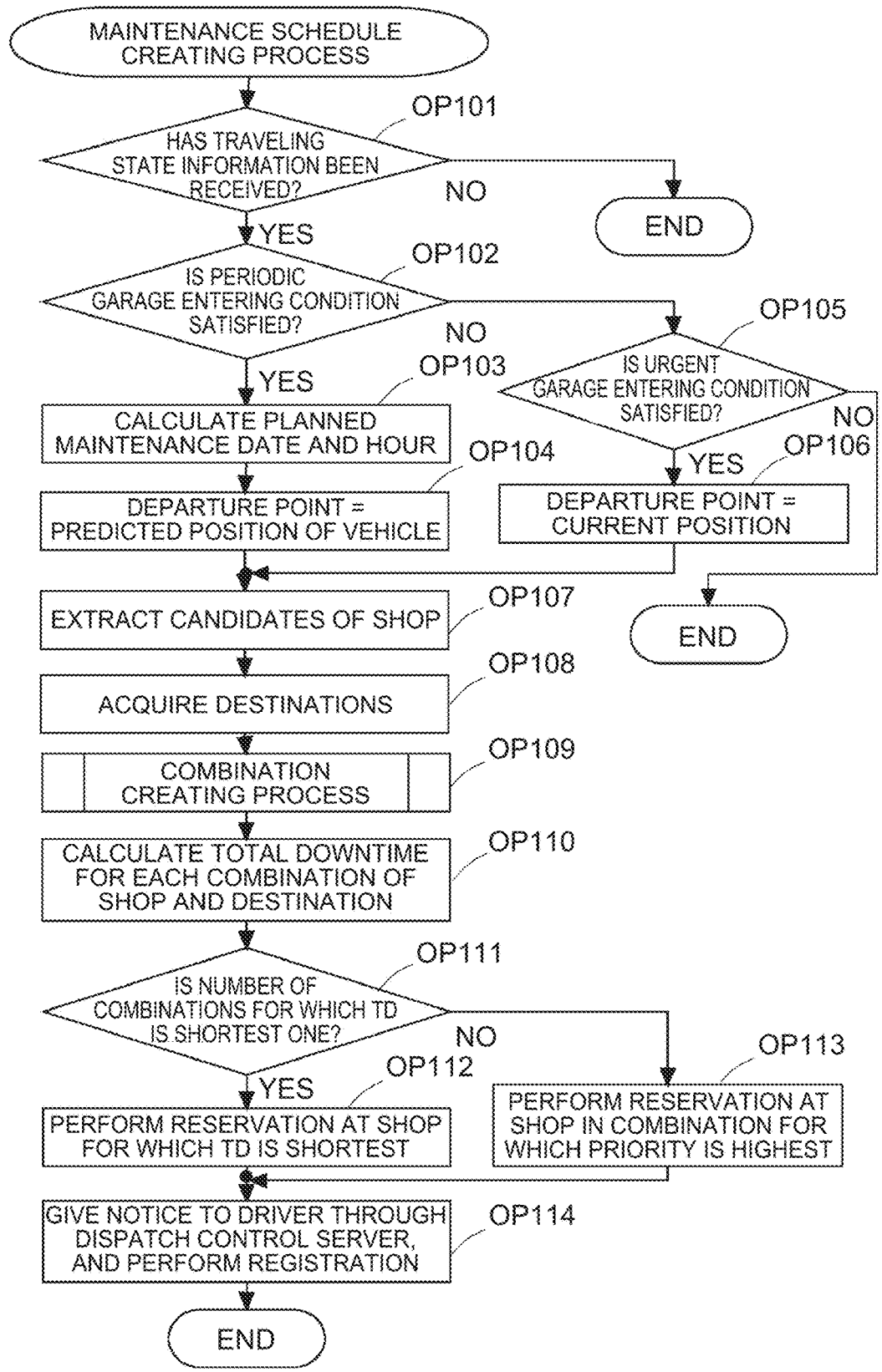
FIG. 9 is an example of a flowchart of a maintenance schedule creating process in the center server.

FIG. 9 is an example of a flowchart of a maintenance schedule creating process in the center server 1. The process shown in FIG. 9 is repeatedly executed with a predetermined period. The subject that executes the process shown in FIG. 9 is the CPU 101 of the center server 1, but for the sake of convenience, the description will be made while the functional configuration element is regarded as the subject. The same goes for flowcharts described later.

In OP101, the control unit 11 determines whether the traveling state information has been received from the vehicle 50, through the vehicle communication unit 13. In the case where the traveling state information has been received from the vehicle 50 (OP101; YES), the process proceeds to OP102. In the case where the traveling state information has not been received from the vehicle 50 (OP101: NO), the process shown in FIG. 9 ends.

In OP102, the control unit 11 determines whether the periodic garage entering condition is satisfied, based on the traveling state information about the vehicle 50 received in OP101. In the case where the periodic garage entering condition is satisfied (OP102: YES), the process proceeds to OP103. In the case where the periodic garage entering condition is not satisfied (OP102: NO), the process proceeds to OP105.

In OP103, the control unit 11 calculates the planned maintenance date and hour for the periodic garage entering. For example, the control unit 11 sets the planned maintenance date and hour for the periodic garage entering to a predetermined hour on a date after a predetermined number of days. In OP104, the control unit 11 sets the planned departure date and hour in the schedule of the maintenance to an hour that is a predetermined time before the planned maintenance date and hour, and sets the departure point to the predicted traveling position of the vehicle 50. The traveling position of the vehicle 50 on the panned departure date and hour is acquired from the position estimation unit 12.

In OP105, the control unit 11 determines whether the urgent garage entering condition is satisfied, based on the traveling state information about the vehicle 50 received in OP101. In the case where the urgent garage entering condition is satisfied (OP105: YES), the process proceeds to OP106. In the case where the urgent garage entering condition is not satisfied (OP105: NO), the process shown in FIG. 9 ends.

In OP106, the control unit 11 sets the planned maintenance date and hour for the urgent garage entering to an hour after a predetermined time from the current hour, sets the planned departure date and hour in the schedule of the maintenance to the current hour, and sets the departure point to the current position of the vehicle 50. The current position of the vehicle 50 is a position indicated by the position information that is included in the traveling state information received in OP101.

In OP107, the control unit 11 extracts a predetermined number of shops as the shop that the vehicle 50 can enter on the planned maintenance date and hour. For example, the determination condition for the shop that the vehicle 50 can enter is a condition that the shop is available around the planned maintenance date and hour, the shop includes equipment allowing the menu of the maintenance to be performed and the vehicle 50 can arrive at the shop from the departure point around the planned maintenance date and hour.

In OP108, the control unit 11 acquires a predetermined number of destinations as the destination in the schedule of the maintenance. In OP108, for example, the control unit 11 acquires the dispatch reservation information from the dispatch control server 2 through the server communication unit 14. For example, a place where the demand for the dispatch service is predicted to be generated within a predetermined time after the planned maintenance date and hour in a range of a predetermined distance from the departure point of the vehicle 50, as exemplified by a place where a passenger having a reservation for the dispatch service gets in the vehicle 50, an event place where people gather, and a station of a railroad when a bad weather is predicted, is acquired as the destination in the schedule of the maintenance.

In OP109, a combination crating process for the shop and the destination is performed. Details of the process in OP109 will be described later.

In OP110, the control unit 11 calculates the total downtime for each combination of the shop and the destination that is created in OP109. In OP111, the control unit 11 determines whether the number of combinations of the shop and the destination for which the total downtime is shortest is one. In the case where the number of combinations of the shop and the destination for which the total downtime is shortest is one (OP111: YES), the process proceeds to OP112. In OP112, the control unit 11 selects the combination of the shop and the destination for which the total downtime is shortest, creates the maintenance schedule information of the vehicle 50 for the combination, and reserves the maintenance about the vehicle 50 at the shop in the combination.

In the case where there are a plurality of combinations of the shop and the destination for which the total downtime is shortest (OP111: NO), the process proceeds to OP113. In OP113, the control unit 11 evaluates the priority for each of the plurality of combinations of the shop and the destination for which the total downtime is shortest, and reserves the maintenance of the vehicle 50 at the shop in the combination for which the priority is highest. For example, the priority of the combination of the shop and the destination may be acquired based on the road information about the road on the movement route, or may be acquired based on the possibility that the demand for the dispatch service is generated on the route from the departure point to the shop.

In OP114, the control unit 11 sends the created maintenance schedule information to the dispatch control server 2 through the server communication unit 14, and registers the created maintenance schedule information in the maintenance schedule information DB 18. When the dispatch control server 2 receives the maintenance schedule information from the center server 1, the dispatch control server 2 gives the notice of the maintenance schedule information to the user terminal 4 of the driver of the vehicle 50. Thereafter, the process shown in FIG. 9 ends.

Figure 10:
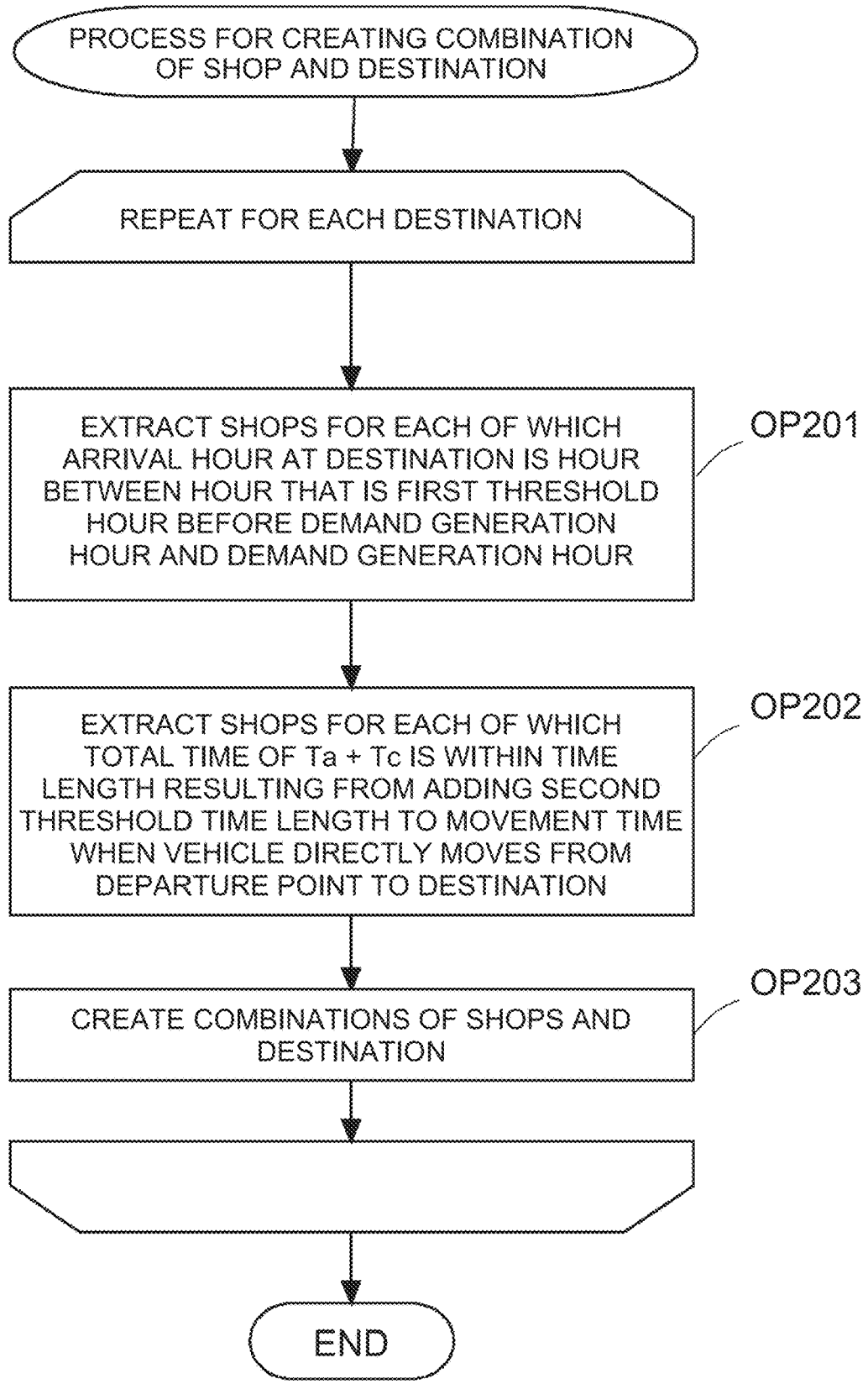
FIG. 10 is an example of a flowchart of a narrowing process for a combination of a shop and a destination in the center server.

FIG. 10 is an example of a flowchart of a narrowing process for the combination of the shop and the destination in the center server 1. The process shown in FIG. 10 corresponds to the process that is executed in OP109 of FIG. 9. Processes in OP201 to OP203 are repeatedly executed by the number of the destinations acquired in OP108 of FIG. 9.

In OP201, from the shop candidates extracted in OP107 of FIG. 9, the control unit 11 extracts shops for each of which the hour when the vehicle 50 arrives at the target destination is an hour between an hour that is a first threshold time length before an hour when the demand for the dispatch service is generated at the target destination and the hour when the demand is generated.

In OP202, from the shops extracted in OP201, the control unit 11 further extracts shops for each of which the total time of the movement time Ta from the departure point to the shop and the movement time Tc from the shop to the target destination is within a time length resulting from adding a second threshold time length to the movement length when the vehicle 50 directly moves from the departure point to the target destination.

In OP203, the control unit 11 creates combinations of shops extracted as a result of the process in OP202 and the target destination. Thereafter, the process is performed from OP201 for the next target destination. Alternatively, in the case where the processes from OP201 to OP203 end for all destinations, the process proceeds to OP110 of FIG. 9.

Figure 11:
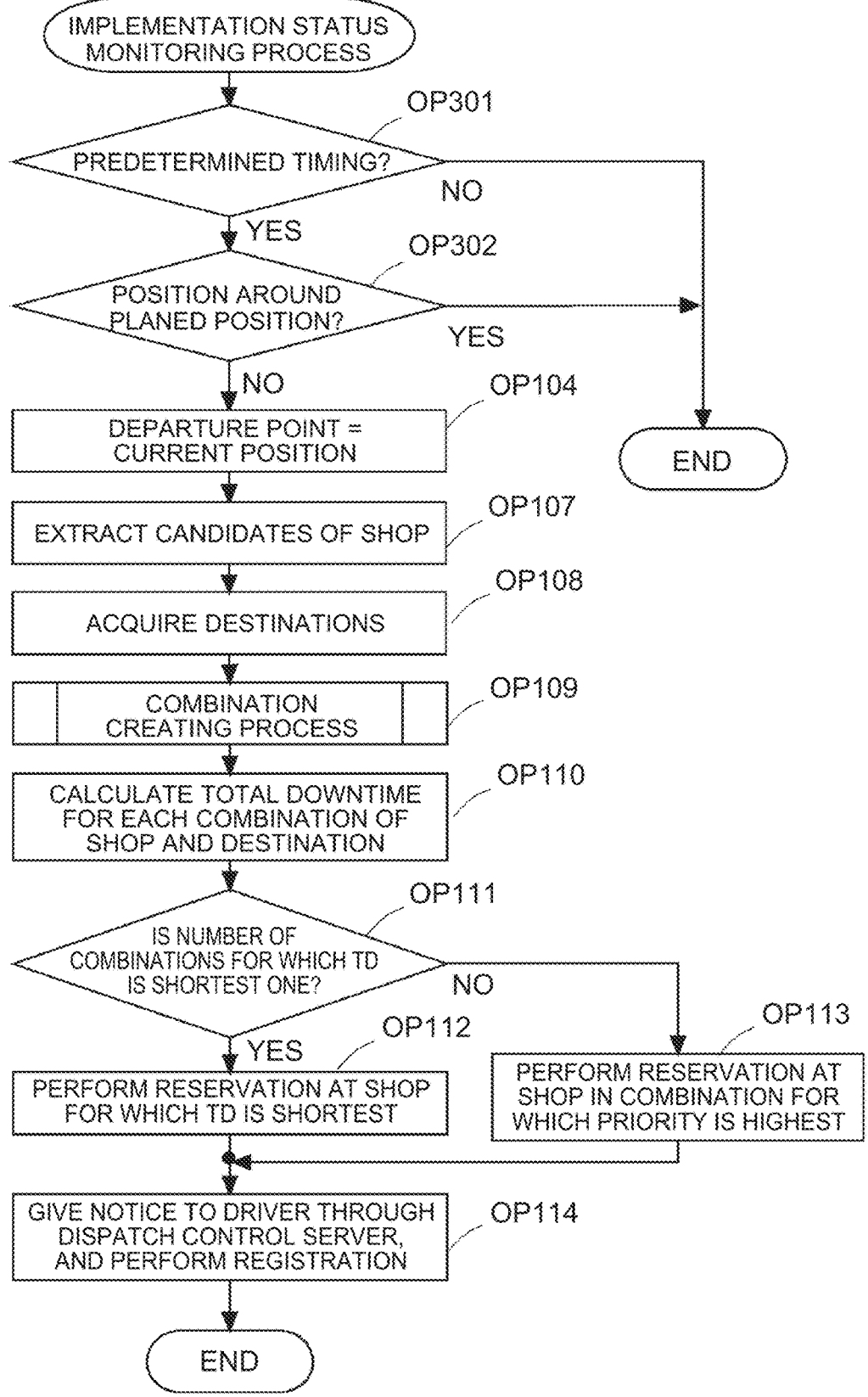
FIG. 11 is an example of a flowchart of an implementation status monitoring process in the center server.

FIG. 11 is an example of a flowchart of an implementation status monitoring process in the center server 1. The implementation status monitoring process is a process for monitoring whether the schedule of the maintenance of the vehicle 50 generated by the center server 1 is being carried out. The process shown in FIG. 11 is repeatedly executed with a predetermined period. The process shown in FIG. 11 is executed in units of the maintenance schedule information held in the maintenance schedule information DB 18.

In OP301, the control unit 11 determines whether the current timing is a predetermined timing. For example, the predetermined timing in OP301 is a timing in the maintenance schedule information held in the maintenance schedule information DB 18, as exemplified by a planned departure hour at the departure point, a planned arrival hour at the shop where the maintenance is planned, and a predetermined hour between the planned departure hour and the planned arrival hour at the shop. That is, the process in OP302 and subsequent processes are performed multiple times, for the maintenance schedule information about one maintenance of the vehicle 50.

In the case of being the predetermined timing (OP301: YES), the process proceeds to OP302. In the case of being not the predetermined timing (OP301: NO), the process shown in FIG. 11 ends.

In OP302, the control unit 11 determines whether the vehicle 50 is currently traveling at a position planned in the maintenance schedule information. For example, in the case where the current hour is the planned departure hour in the schedule of the maintenance, the control unit 11 determines whether the vehicle 50 is traveling near the departure point. For example, in the case where the current hour is the planned arrival hour at the shop in the schedule of the maintenance, the control unit 11 determines whether the vehicle 50 is traveling near the shop. For example, in the case where the current hour is the predetermined hour between the planned departure hour in the schedule of the maintenance and the planned arrival hour at the shop, the control unit 11 determines whether the vehicle 50 is traveling on the route from the departure point to the shop.

In the case where the vehicle 50 is currently traveling at the position planned in the maintenance schedule information (OP302: YES), it is determined that the vehicle 50 is traveling in accordance with the schedule of the maintenance, and the process shown in FIG. 11 ends.

In the case where the vehicle 50 is currently traveling at a different position from the position planned in the maintenance schedule information (OP302: NO), it is determined that the vehicle 50 is not traveling in accordance with the schedule of the maintenance, and the process proceeds to OP104.

The processes from OP104 to OP113 are the same as the processes from OP104 to OP113 in FIG. 9. That is, in the case where the vehicle 50 is currently traveling at a different position from the position planned in the maintenance schedule information, the position where the vehicle 50 is currently traveling is set as the departure point, and the maintenance schedule about the vehicle 50 is created again. Thereby, even when the vehicle 50 travels so as to deviate from the schedule of the maintenance, it is possible to fulfill the maintenance of the vehicle 50.

The processes shown in FIG. 9 to FIG. 11 are examples, and when appropriate, the addition and removal of processes, the alternation of the execution order or the like can be performed depending on the execution manner.

Function Effect of First Embodiment

With the first embodiment, the schedule of the maintenance of the vehicle 50 includes a place where there is a possibility that the demand for the dispatch service is generated after the maintenance, as the destination, and thereby it is possible to decide the shop where the maintenance is performed, such that the total downtime of the vehicle 50 is shortened. Further, in the first embodiment, the schedule of the maintenance of the vehicle 50 is created based on the combination of the shop and the destination for which the total downtime is shortest, and therefore, it is possible to cause the loss of the business opportunity to be smaller.

Further, in the first embodiment, the center server 1 reserves the maintenance of the vehicle 50 at the shop, and therefore it is possible to save effort of the dispatch control server 2 and the driver of the vehicle 50, and to fulfill the maintenance. Further, the center server 1 monitors the traveling of the vehicle 50, and in the case where the vehicle 50 travels so as to deviate from the schedule of the maintenance, the center server 1 creates the schedule of the maintenance again, so that it is possible to fulfill the maintenance of the vehicle 50.

Second Embodiment

In the first embodiment, the vehicle 50 is a vehicle that includes the in-vehicle device 5 having a communication function and that travels while being driven by the driver. In a second embodiment, the scheduling of the maintenance of an automatic driving vehicle is performed instead of the vehicle 50. In the second embodiment, the same descriptions as those in the first embodiment are omitted.

Figure 12:
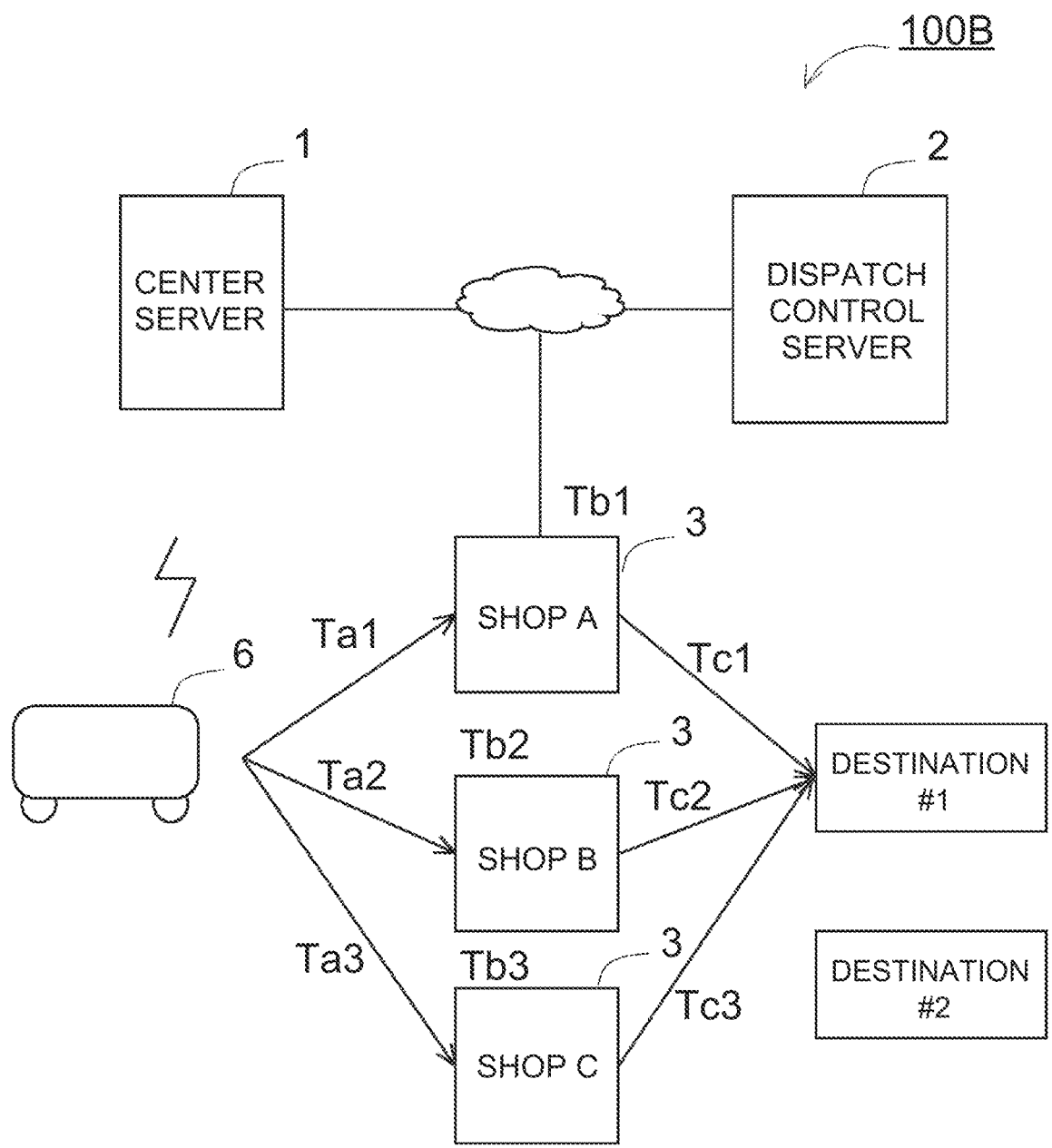
FIG. 12 is a diagram showing an example of the system configuration of a maintenance scheduling system according to a second embodiment.

FIG. 12 is a diagram showing an example of the system configuration of a maintenance scheduling system 100B according to the second embodiment. The maintenance scheduling system 100B includes the center server 1, the dispatch control server 2, the shop server 3 and a vehicle 6. The vehicle 6 is an automatic driving vehicle that can perform driverless traveling, and includes a control device that can execute the same process as the process by the in-vehicle device 5 in the first embodiment.

In the second embodiment, the vehicle 6 sends the traveling state information to the center server 1. In the second embodiment, the vehicle 6 itself communicates with the dispatch control server 2, and the dispatch control server 2 sends the maintenance schedule information about the vehicle 6 that is created by the center server 1, to the vehicle 6. In the process by the center server 1, which is the same as that in the first embodiment, the determination about the garage entering of the vehicle 6 is performed based on the traveling state information from the vehicle 6, and the schedule of the maintenance that includes the shop where the maintenance is executed and the destination after that is created such that the total downtime is shortened. Accordingly, with the second embodiment, also for the maintenance of the automatic driving vehicle, it is possible to create the schedule of the maintenance such that the total downtime is shortened.

Third Embodiment

Figure 13:
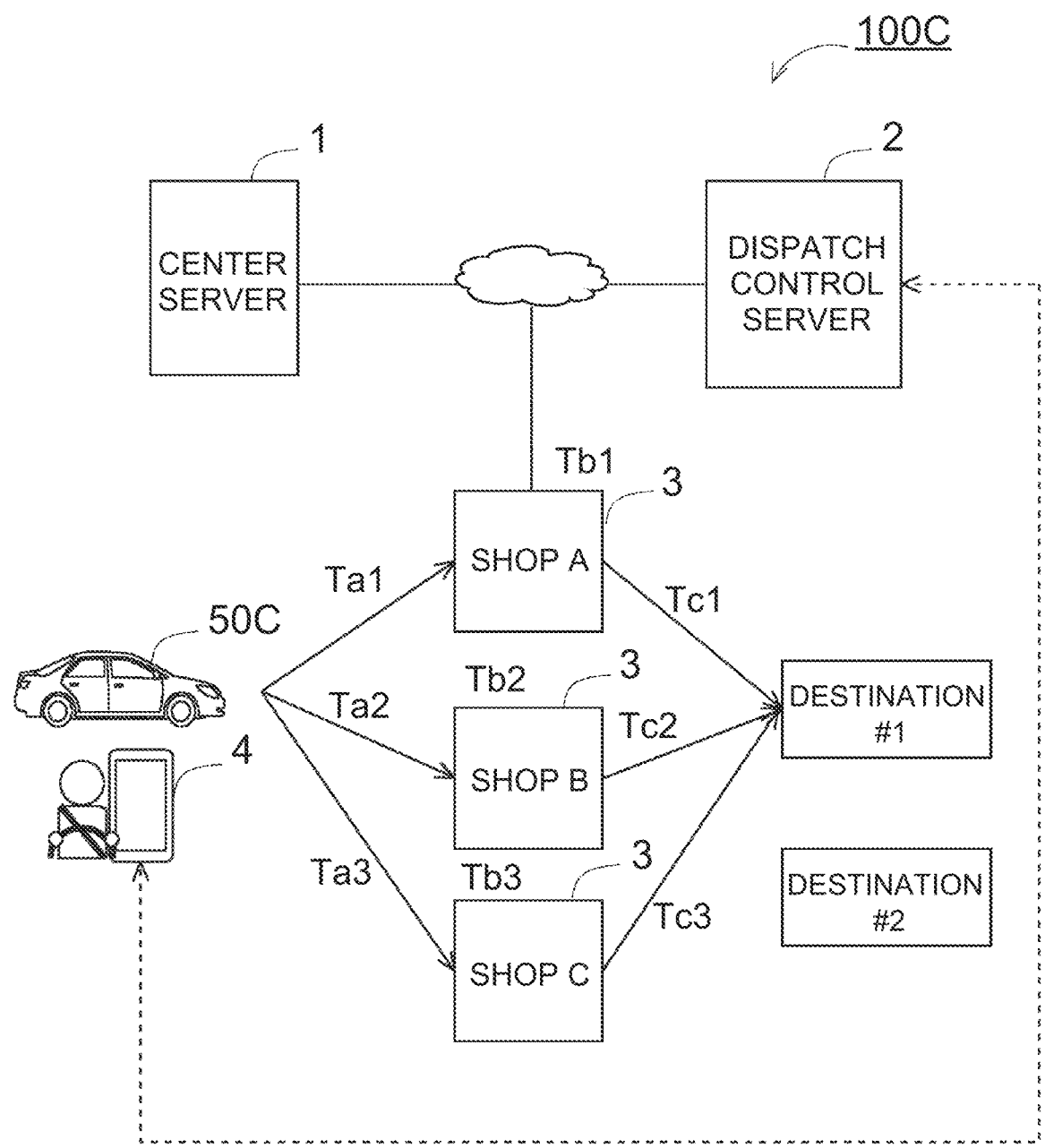
FIG. 13 is a diagram showing an example of the system configuration of a maintenance scheduling system according to a third embodiment.

In a third embodiment, for a vehicle that does not include the in-vehicle device 5, the schedule of the maintenance is created such that the total downtime is shortened. FIG. 13 is a diagram showing an example of the system configuration of a maintenance scheduling system 100C according to the third embodiment.

The maintenance scheduling system 100C includes the center server 1, the dispatch control server 2, the shop server 3 and the user terminal 4. In the third embodiment, for example, the driver of a vehicle 50C inputs the traveling distance of the vehicle 50C and the like to the user terminal 4, and the user terminal 4 sends the traveling state information including the position information about the user terminal 4, the traveling distance of the vehicle 50C and the like to the center server 1 through the dispatch control server 2. Except this point, the process by the center server 1 is the same as that in the first embodiment. The determination about the garage entering of the vehicle 50C is performed based on the traveling state information from the user terminal 4, and the schedule of the maintenance that includes the shop where the maintenance is executed and the destination after that is created such that the total downtime is shortened. The notice of the created schedule information is given from the center server 1 to the user terminal 4 through the dispatch control server 2. Accordingly, with the third embodiment, also for the maintenance of the vehicle that has no communication function, it is possible to create the schedule of the maintenance such that the total downtime is shortened.

OTHER EMBODIMENTS

The above embodiments are just examples, and the present disclosure can be carried while being appropriately modified without departing from the spirit of the present disclosure.

In the first embodiment to the third embodiment, the center server 1 selects the combination of the shop and the destination for which the total downtime is shortest, and creates the schedule of the maintenance of the vehicle 50 based on the selected combination. As a modification, the center server 1 may present the total downtimes for a plurality of combinations of the candidate of the shop where the maintenance is performed and the destination, to the driver of the vehicle 50, without creating the schedule of the maintenance of the vehicle 50. More specifically, the center server 1 executes the processes from OP101 to OP110 in FIG. 9, and sends a plurality of combinations of the shop and the destination and the total downtimes for the combinations, to the user terminal 4 of the driver of the vehicle 50, through the dispatch control server 2. Thereby, the driver of the vehicle 50 can refer to the total downtimes, the shop candidates and the destinations, and can select the shop where the maintenance is performed, at driver's convenience.

In the first embodiment to the third embodiment, in the case where the center server 1 makes the determination of the garage entering of the vehicle 50, the center server 1 set the planned maintenance date and hour. The center server 1 may perform a plurality of settings of the planned maintenance date and hour. In this case, the center server 1 may calculate the total downtime for the combination of the shop and the destination, for the respective settings of the planned maintenance date and hour, and may create the schedule for the combination for which the total downtime is shortest among all settings of the planned maintenance date and hour. Alternatively, the center server 1 may create the schedule about the combination for which the total downtime is shortest, for the respective settings of the planned maintenance date and hour, and may give the notice of the plurality of pieces of the maintenance schedule information, to the user terminal 4 of the driver of the vehicle 50. The driver of the vehicle 50 selects proper maintenance schedule information from the plurality of pieces of maintenance schedule information different in the planned maintenance date and hour, at driver's convenience, and the center server 1 reserves the maintenance at the shop in the selected maintenance schedule information.

Further, in the first embodiment to the third embodiment, the vehicle that is used for the dispatch service is intended, but the technologies in the first embodiment to the third embodiment can be applied to a vehicle other than the vehicle that is used for the dispatch service. In the case of the application to the vehicle other than the vehicle that is used for the dispatch service, the destination in the schedule of the maintenance may be set to a place that is set in a driver's schedule, for example.

The processes and means described in the present disclosure can be freely combined and executed, as long as there is no technical inconsistency.

A process described as a process that is performed by a single device may be divided and executed by a plurality of devices. Further, processes described as processes that are performed by different devices may be executed by a single device. In the computer system, the hardware configuration (server configuration) to realize the functions can be flexibly altered.

The present disclosure can realized also when a computer program including the functions described in the above embodiments is supplied to a computer and one or more processors included in the computer read and execute the program. The computer program may be provided to the computer through a non-transitory computer-readable storage medium that can be connected with a system bus of the computer, or may be provided to the computer through a network. Examples of the non-transitory computer-readable storage medium include an arbitrary type of disk such as a magnetic disk (a Floppy® disk, a hard disk drive (HDD) and the like) and an optical disk (a CD-ROM, a DVD disk, a Blu-ray disk and the like), and an arbitrary type of medium suitable for storing electronic commands, as exemplified by a read only memory (ROM), a random access memory (RAM), an EPROM, an EEPROM, a magnetic card, a flash memory and an optical card.

What is claimed is:

1. An information processing device, comprising:
   a control unit configured to execute
      selecting a plurality of shops where inspection or repair of a vehicle is capable of being performed;
      acquiring a plurality of destinations;
      calculating, for all combinations of each of the plurality of shops and each of the plurality of destinations, a total time length of a first time length, a second time length and a third time length,
         the first time length being a time length that is spent on movement of the vehicle from a departure point to a shop of the plurality of shops,
         the second time length being a time length that is spent on the inspection or repair at the shop,
         the third time length being a time length that is spent on movement from the shop to a destination of the plurality of destinations;
      acquiring a number of combinations of (i) the shop of the plurality of shops and (ii) the destination of the plurality of destinations for which the total time length is shortest;
      in response to the acquired number of combinations being one,
         creating a maintenance schedule information of the vehicle for a combination of a first shop of the plurality of shops and a first destination of the plurality of destinations for which the total time length is shortest, and
         reserving a maintenance of the vehicle at the first shop; and
      in response to the acquired number of combinations being a plurality of combinations including two or more combinations,
         evaluating a priority of the plurality of destinations for each of the plurality of combinations for which the total time length is shortest, and
         reserving a maintenance of the vehicle at a second shop of the plurality of shops in a further combination for which the priority is highest, wherein
   the vehicle is an automatic driving vehicle configured to perform driverless traveling, and
   the control unit is further configured to execute
      in response to the reserving of the maintenance of the vehicle at the first shop, controlling the vehicle to autonomously drive to enter the first shop in the combination based on the created maintenance schedule information, and
      in response to the reserving of the maintenance of the vehicle at the second shop, controlling the vehicle to autonomously drive to enter the second shop based on the reservation of the maintenance of the vehicle at the second shop.

2. The information processing device according to claim 1, wherein:
   the control unit is further configured to execute
      receiving traveling state information relevant to traveling of the vehicle, and
      deciding a planned date and hour for the inspection or repair of the vehicle based on the traveling state information; and
   the control unit is configured to execute
      selecting the plurality of shops where the inspection or repair of the vehicle is capable of being performed on the planned date and hour, and
      acquiring the plurality of destinations where there is a demand for the vehicle around the planned date and hour.

3. The information processing device according to claim 2, wherein:
   the traveling state information includes at least position information of the vehicle; and
   the control unit is further configured to execute
      in response to a first condition being satisfied based on the traveling state information, acquiring a predicted traveling position of the vehicle at an hour that is a predetermined time before the planned date and hour, based on traveling history information including a history of the position information of the vehicle, and setting the predicted traveling position of the vehicle as the departure point.

4. The information processing device according to claim 2, wherein:

the control unit is on the automatic driving vehicle;

the traveling state information includes at least position information of the automatic driving vehicle; and the control unit is further configured to execute, in response to (i) a second condition being satisfied based on the traveling state information and (ii) an urgency of the inspection or repair of the automatic driving vehicle being greater than a predetermined value, setting a current position of the automatic driving vehicle as the departure point, calculating a total downtime for each combination of (a) a candidate shop of the plurality of shops for the inspection or repair and (b) the destination, controlling the automatic driving vehicle to immediately move toward the candidate shop where the total downtime is shortest.

5. The information processing device according to claim 1, wherein the maintenance schedule information includes information of the inspection or repair of the vehicle at the first shop and the movement to the first destination after the inspection or repair at the first shop.

6. The information processing device according to claim 5, wherein the control unit is further configured to execute selecting the combination of the first shop and the first destination of which the control unit creates the maintenance schedule information, based on the total time length and road information relevant to a road included in a route from the departure point to the first shop and a route from the first shop to the first destination.

7. The information processing device according to claim 5, wherein the control unit is configured to execute selecting the combination of the first shop and the first destination of which the control unit creates the maintenance schedule information, based on the total time length and a possibility that a passenger gets in and gets off the vehicle on a route from the departure point to the first shop.

8. The information processing device according to claim 5, wherein the control unit is configured to execute, in response to the vehicle performing an action different from the maintenance schedule information, selecting again the combination of the first shop and the first destination for which the total time length is shortest, and recreating the maintenance schedule information.

9. The information processing device according to claim 1, wherein the control unit is configured to execute acquiring the combination of the first shop and the first destination for which an hour when the vehicle is planned to arrive at the first destination from the first shop is an hour between an hour that is a first threshold time length before an hour when a demand for dispatch is generated at the first destination and the hour when the demand for the dispatch is generated, and calculating the total time length of the acquired combination of the first shop and the first destination.

10. The information processing device according to claim 1, wherein the control unit is configured to execute acquiring the combination of the first shop and the first destination for which a total time length of the first time length and the third time length is shorter than a time length resulting from adding a second threshold time length to a movement time when the vehicle directly moves from the departure point to the first destination, and calculating the total time length of the acquired combination of the first shop and the first destination.

11. An information processing method, comprising:

selecting a plurality of shops where inspection or repair of a vehicle is capable of being performed;

acquiring a plurality of destinations where there is a demand for dispatch;

calculating, for all combinations of each of the plurality of shops and each of the plurality of destinations, a total time length of a first time length, a second time length and a third time length, the first time length being a time length that is spent on movement of the vehicle from a departure point to a shop of the plurality of shops, the second time length being a time length that is spent on the inspection or repair at the shop, the third time length being a time length that is spent on movement from the shop to a destination of the plurality of destinations;

acquiring a number of combinations of (i) the shop of the plurality of shops and (ii) the destination of the plurality of destinations for which the total time length is shortest;

in response to the acquired number of combinations being one, creating a maintenance schedule information of the vehicle for a combination of a first shop of the plurality of shops and a first destination of the plurality of destinations for which the total time length is shortest, and reserving a maintenance of the vehicle at the first shop; and in response to the acquired number of combinations being a plurality of combinations including two or more combinations, evaluating a priority of the plurality of destinations for each of the plurality of combinations for which the total time length is shortest, and reserving a maintenance of the vehicle at a second shop of the plurality of shops in a further combination for which the priority is highest, wherein the vehicle is an automatic driving vehicle configured to perform driverless traveling, and the information processing method further comprises in response to the reserving of the maintenance of the vehicle at the first shop, controlling the vehicle to autonomously drive to enter the first shop in the combination based on the created maintenance schedule information, and in response to the reserving of the maintenance of the vehicle at the second shop, controlling the vehicle to autonomously drive to enter the second shop based on the reservation of the maintenance of the vehicle at the second shop.

12. The information processing method according to claim 11, wherein:
   traveling state information relevant to traveling of the vehicle is received;
   a planned date and hour for the inspection or repair of the vehicle is decided based on the traveling state information;
   the plurality of shops where the inspection or repair of the vehicle is capable of being performed on the planned date and hour are selected; and
   the plurality of destinations where there is a demand for the vehicle around the planned date and hour are acquired.

13. The information processing method according to claim 12, wherein:
   the traveling state information includes at least position information of the vehicle; and
   the information processing method further comprises:
      in response to a first condition being satisfied based on the traveling state information,
         acquiring a predicted traveling position of the vehicle on the planned date and hour, based on traveling history information including a history of the position information of the vehicle, and
         setting the predicted traveling position of the vehicle as the departure point.

14. The information processing method according to claim 12, wherein:
   the information processing method is performed by a control unit, which is on the automatic driving vehicle;
   the traveling state information includes at least position information of the automatic driving vehicle; and
   the information processing method further comprises
      in response to (i) a second condition being satisfied based on the traveling state information and (ii) an urgency of the inspection or repair of the automatic driving vehicle being greater than a predetermined value,
         setting a current position of the automatic driving vehicle as the departure point,
         calculating a total downtime for each combination of (a) a candidate shop of the plurality of shops for the inspection or repair and (b) the destination,
         controlling the automatic driving vehicle to immediately move toward the candidate shop where the total downtime is shortest.

15. The information processing method according to claim 11, wherein
   the schedule information includes information of the inspection or repair of the vehicle at the first shop and the movement to the first destination after the inspection or repair at the first shop.

16. The information processing method according to claim 15, further comprising:
   in response to the vehicle performing an action different from the maintenance schedule information,
      selecting again the combination of the first shop and the first destination for which the total time length is shortest, and
      recreating the maintenance schedule information.

17. The information processing method according to claim 11, wherein:
   the combination of the first shop and the first destination for which an hour when the vehicle is planned to arrive at the first destination from the first shop is an hour between an hour that is a first threshold time length before an hour when a demand for dispatch is generated at the first destination and the hour when the demand for the dispatch is generated is acquired; and
   the total time length is calculated of the acquired combination of the first shop and the first destination.

18. The information processing method according to claim 11, wherein:
   the combination of the first shop and the first destination for which a total time length of the first time length and the third time length is shorter than a time length resulting from adding a second threshold time length to a movement time when the vehicle directly moves from the departure point to the first destination is acquired; and
   the total time length is calculated of the acquired combination of the first shop and the first destination.

19. The information processing device according to claim 1, wherein
   the priority of the plurality of destinations is in the order of (a) a getting-in place for a passenger having a reservation for a dispatch service and designating a driver of the vehicle, (b) a getting-in place for the passenger having the reservation for the dispatch service and not designating the driver, (c) an event place where people gather, and (d) a station of a railroad when a bad weather is predicted.

20. The information processing method according to claim 11, wherein
   the priority of the plurality of destinations is in the order of (a) a getting-in place for a passenger having a reservation for a dispatch service and designating a driver of the vehicle, (b) a getting-in place for the passenger having the reservation for the dispatch service and not designating the driver, (c) an event place where people gather, and (d) a station of a railroad when a bad weather is predicted.

* * * * *